R. D. BALLARD.
ADJUSTABLE TRACTIVE ATTACHMENT FOR TRACTION WHEELS.
APPLICATION FILED MAR. 23, 1920.
1,376,792.
Patented May 3, 1921.
2 SHEETS—SHEET 1.
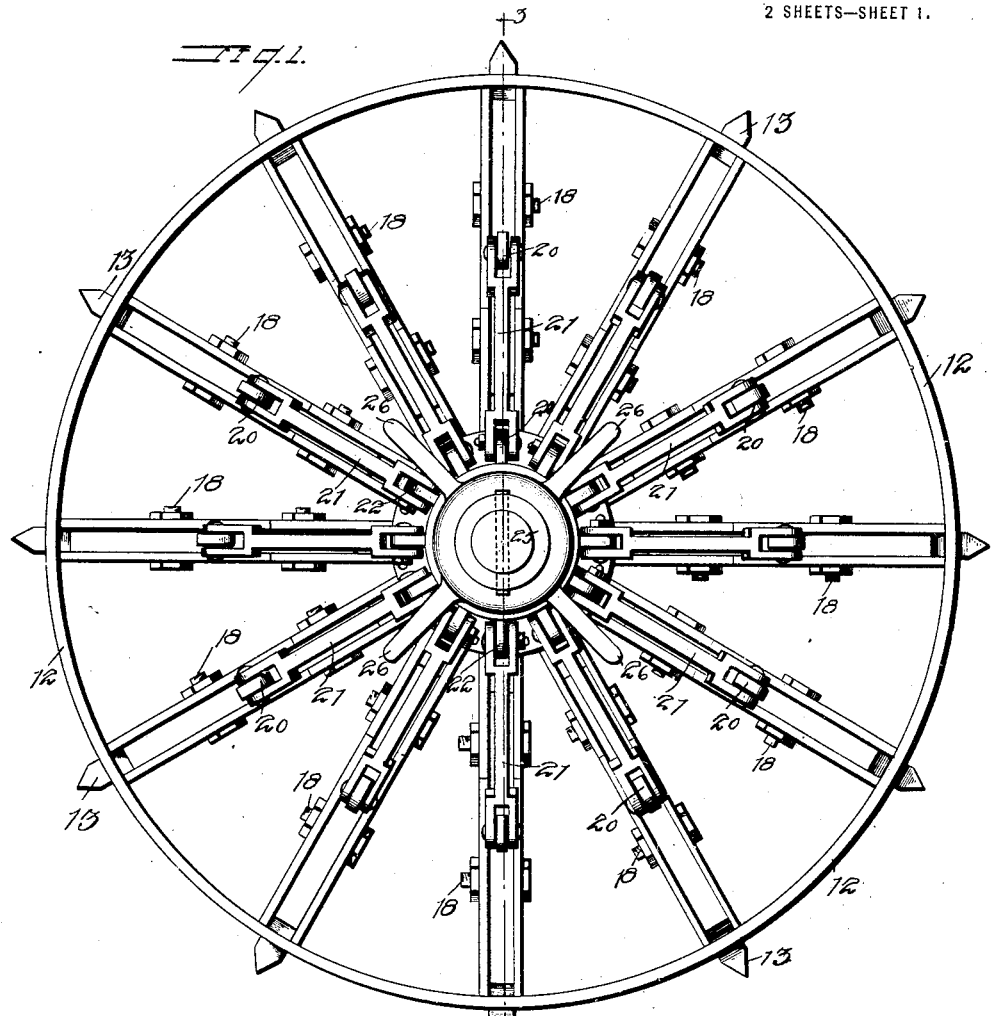
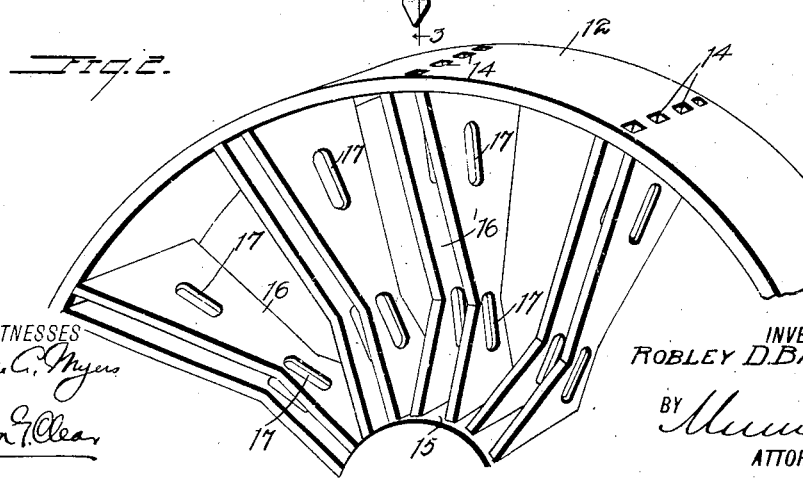
WITNESSES
INVENTOR
ROBLEY D. BALLARD,
BY
ATTORNEYS R. D. BALLARD.
ADJUSTABLE TRACTIVE ATTACHMENT FOR TRACTION WHEELS.
APPLICATION FILED MAR. 23, 1920.
1,376,792.
Patented May 3, 1921.
2 SHEETS—SHEET 2.
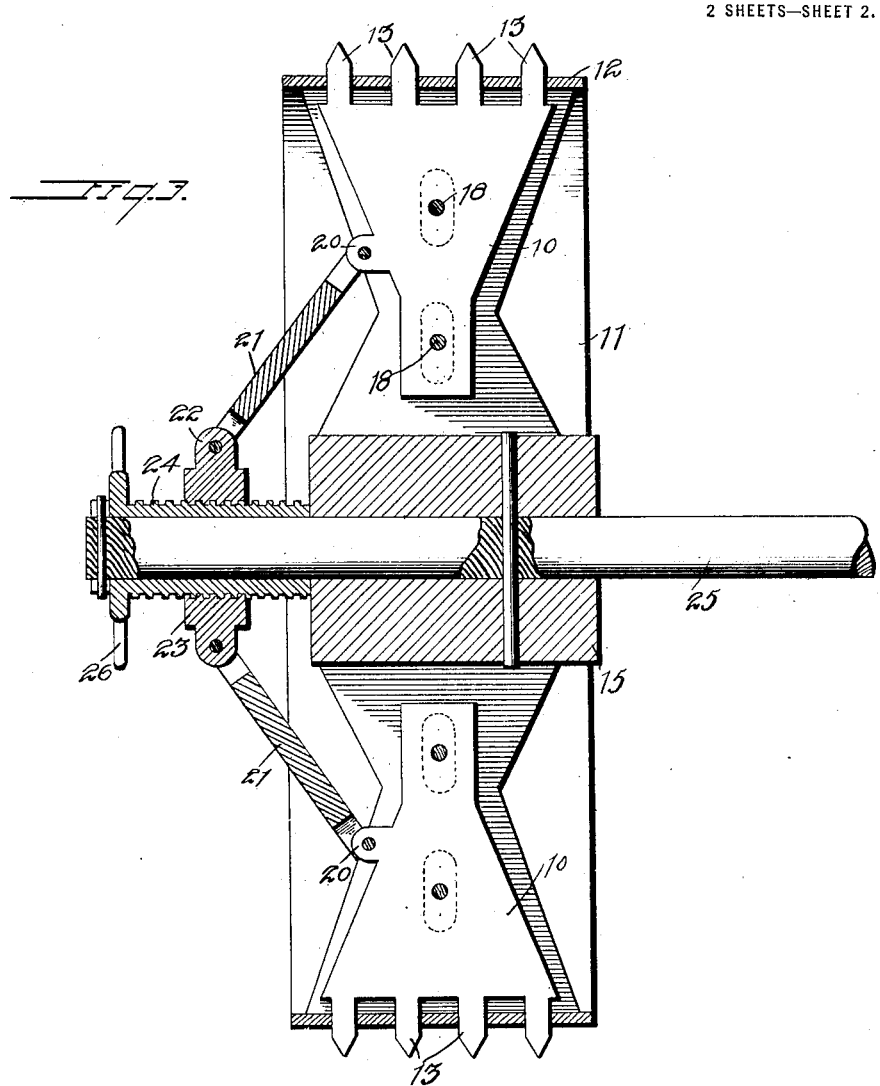
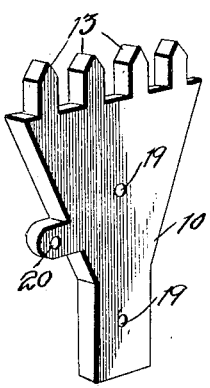
WITNESSES
INVENTOR
ROBLEY D. BALLARD,
BY
ATTORNEYS

UNITED STATES PATENT OFFICE.

ROBLEY DUNGLISON BALLARD, OF ST. PETERSBURG, FLORIDA.

ADJUSTABLE TRACTIVE ATTACHMENT FOR TRACTION-WHEELS.

1,376,792.   Specification of Letters Patent.   Patented May 3, 1921.

Applicaton filed March 23, 1920. Serial No. 367,991.

*To all whom it may concern:*

Be it known that I, ROBLEY D. BALLARD, a citizen of the United States, and a resident of St. Petersburg, in the county of Pinellas and State of Florida, have made certain new and useful Improvements in Adjustable Tractive Attachments for Traction-Wheels, of which the following is a specification.

My present invention relates generally to vehicle wheels and more particularly to the traction wheels of heavy vehicles, my object being the provision of a simple and inexpensive attachment for wheels of this character of an adjustable nature, whereby to provide for the necessary grip upon roadway surfaces and the like under varying conditions.

Generally speaking, my invention proposes the use of radial adjustable tractive members whose outer ends are projectable through the rim or periphery of the wheel, disposed slidably and radially within the wheels, and whose movement is controlled at all times by manually actuated means normally inactive so as to maintain the tractive members in adjusted position.

In the accompanying drawing illustrating my present invention:—

Figure 1 is a side elevation of a wheel constructed in accordance with my present invention;

Fig. 2 is a detailed perspective view of a portion of the wheel frame with the tractive elements removed;

Fig. 3 is a vertical transverse section taken substantially on line 3—3 of Fig. 1, and, Fig. 4 is a detailed perspective view of one of the tractive elements removed.

Referring now to these figures my invention proposes the use of radially slidable tractive elements 10, in connection with a wheel generally indicated at 11, and having a relatively broad flat periphery or rim 12, the tractive elements 10 being each provided at their outer ends with a series of projecting spurs 13, and the rim 12 having conformable series of openings 14 outwardly through which the spurs 13 are projectable to varying extents.

The bodies of the tractive members 10 are slidable radially of the wheel between its rim 12, and its hub portion 15, and are guided in such adjustable movement between flat radial ribs 16, which latter are arranged in pairs and may, if so desired, take the place of the usual spokes, these ribs 16 having longitudinal slots 17 through which project the ends of guide bolts 18, the latter extending through apertures 19 of the tractive members 10.

At one side each of the tractive members 10 has an apertured lug 20, connected by means of a toggle arm 21, with a portion of the periphery 22 of an adjusting nut 23, whose inner surface is threaded upon an adjusting sleeve 24.

The adjusting sleeve 24 is rotatable upon one extended end of the wheel shaft 25, and is provided at one end with an enlarged portion having angularly projecting handles 26 forming a hand wheel by means of which the sleeve 24 may be rotated upon the shaft 25, and with respect to the wheel 11, so that considering the relative immovability of the wheel, and consequently the relative immovability of the nut 23, rotation of the sleeve 24 with its threaded engagement with said nut will cause longitudinal movement of the latter so as to shift the tractive members 10 as a series inwardly or downwardly, dependent upon the direction of such rotation.

It is obvious from the foregoing that while the adjusting parts normally remain inactive, the sleeve 24 being normally fixed to the shaft by a pin as shown, so as to hold the several tractive members in adjusted position, manual adjustment of these parts may be readily brought about to simultaneously shift the several tractive members of the series and project the tractive spurs 13 more or less beyond the periphery or rim 12 thereof, in this way providing for complete and effective traction of the wheel under varying conditions, both as to climatic changes as well as the character of ground over which the vehicle is to operate.

I claim:

1. A traction wheel having a series of flat radial guide plates extending between its hub and its rim and having its rim provided with a series of openings, a series of radially adjustable tractive members slidably mounted in connection with said guide plates, the latter of which form the spokes of the wheel, said tractive members being provided with outwardly projecting tractive spurs movable through the openings of the wheel rim, a shaft on which the wheel is secured having a portion extending beyond one side of the wheel, a sleeve rotatable upon said projecting portion of said shaft and threaded, a nut engaged upon the threaded portion of the sleeve, a handle carried by the sleeve to provide for its rotation, and a series of toggle arms connecting the said nut with the series of tractive members, for the purpose described.

2. A wheel having a hub portion and a rim provided with a series of radially disposed guide plates arranged in pairs therearound, and forming the spokes thereof, said guide plates having slotted openings and said rim having tranversely disposed series of openings, tractive members disposed slidably between the guide plates and having transverse guide bolts mounting through the slots of the guide plates, said tractive members having outwardly projecting spurs at their outer ends movable through the openings of the rim, a shaft upon which the wheel is secured having a projecting portion at one side, a rotatable member on the projecting portion of the shaft having a hand wheel, a member shiftable longitudinally of the shaft by rotation of said rotatable member, and a series of toggle arms connecting the longitudinal shiftable member with the series of tractive members, for the purpose described.

3. A wheel having a hub portion and a rim provided with a series of slotted guide plates extending radially between the hub and the rim and arranged in pairs around the wheels, said rim having series of opening therethrough, radially shiftable tractive members slidably disposed between the said guide plates, said tractive members having guide bolts extending through the slots of said plates and having tractive spurs movable through the openings of the rim, and means for adjusting the tractive members and maintaining the same in adjusted position.

4. A wheel provided with an apertured rim, a plurality of radially adjustable tractive members having spurs movable through the apertures of said rim, a shaft on which the wheel is secured having a projecting portion at one side of the wheel, a manually rotatable sleeve on the said projecting portion of the shaft having a hand wheel, a nut threaded on the said sleeve, and a plurality of toggle arms connecting the nut with the said series of tractive members, for the purpose described.

5. A wheel provided with an apertured rim, a series of radially adjustable tractive members slidable within the wheel provided with spurs at their outer ends movable through the openings of the rim, a shaft upon which the wheel is secured having a projecting portion at one side thereof, means upon the projecting portion of the shaft for shifting tractive members radially of the wheel, and connections between the said shifting means and the tractive members, for the purpose described.

ROBLEY DUNGLISON BALLARD.